United States Patent
Boegel et al.

(10) Patent No.: US 10,950,203 B2
(45) Date of Patent: Mar. 16, 2021

(54) METHOD AND DISPLAY SYSTEM FOR DISPLAYING SENSOR DATA FROM A SENSOR DEVICE ON A DISPLAY DEVICE, AND MOTOR VEHICLE HAVING A DISPLAY SYSTEM

(71) Applicant: AUDI AG, Ingolstadt (DE)

(72) Inventors: Martin Boegel, Ingolstadt (DE); Chavdar Iliev, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/594,832

(22) Filed: Oct. 7, 2019

(65) Prior Publication Data

US 2020/0111450 A1    Apr. 9, 2020

(30) Foreign Application Priority Data

Oct. 8, 2018    (DE) .......................... 102018217127.0

(51) Int. Cl.
  *G09G 5/12*    (2006.01)
  *G06F 3/14*    (2006.01)

(52) U.S. Cl.
  CPC ............... *G09G 5/12* (2013.01); *G06F 3/14* (2013.01); *G09G 2354/00* (2013.01); *G09G 2380/10* (2013.01)

(58) Field of Classification Search
  CPC .. G09G 5/12; G09G 2354/00; G09G 2380/10; G06F 3/14
  See application file for complete search history.

(56) References Cited

U.S. PATENT DOCUMENTS

| | | |
|---|---|---|
| 2005/0055139 A1 | 3/2005 | Tanaka et al. |
| 2013/0073775 A1 | 3/2013 | Wade et al. |
| 2013/0147945 A1* | 6/2013 | Watanabe ............... H04N 7/18 348/118 |
| 2017/0066375 A1* | 3/2017 | Kato ...................... G06T 11/60 |

FOREIGN PATENT DOCUMENTS

| | | |
|---|---|---|
| DE | 102009018586 A1 | 12/2009 |
| DE | 102013000273 A1 | 7/2014 |
| DE | 112014006597 T5 | 4/2017 |
| DE | 102017110896 A1 | 11/2017 |
| DE | 102018217127.0 | 10/2018 |

OTHER PUBLICATIONS

Partial English Translation for German Office Action for German Application No. 102018217127.0 dated May 31, 2019.

* cited by examiner

*Primary Examiner* — Chong Wu
(74) *Attorney, Agent, or Firm* — Staas & Halsey LLP

(57) ABSTRACT

When a display query is received, the display query is evaluated and sensor data is transmitted to a display control in a vehicle computer via a first data path and displayed on a display device. A graphical user interface is loaded and transmitted to the display control unit via a second data path. The graphical user interface is synchronized with the display of the sensor data and the synchronized graphical user interface is displayed with the sensor data on the display device.

19 Claims, 2 Drawing Sheets

METHOD AND DISPLAY SYSTEM FOR DISPLAYING SENSOR DATA FROM A SENSOR DEVICE ON A DISPLAY DEVICE, AND MOTOR VEHICLE HAVING A DISPLAY SYSTEM

CROSS REFERENCE TO RELATED APPLICATIONS

This application claims the benefit of German Application No. 10 2018217127.0 filed on Oct. 8, 2018 and incorporated by reference herein in its entirety.

BACKGROUND

Described below are a method and a display system for displaying sensor data from a sensor on a display and a motor vehicle having the display system.

In modern multimedia systems or in vehicle computers, the display of reversing camera images and further optical contents, for example a view all around the vehicle, depends on the user interface of the respective system. Communication between logical units of a user interface and the respective control device in the vehicle may contain multi-level dialogs and, depending on the respective architecture, may run through various interfaces. Coordination between multimedia systems and function control devices is needed in order to be able to ensure a correct display of the information within the scope of a defined overall concept of the user interface.

In common multimedia systems, only the logical units of the user interface are responsible for the displayed contents (for example video stream, navigation map and so on) as soon as the user interface is available. As a result of multi-layer communication which is present in vehicle computers, an unavoidable latency is produced for each layer to be run through. Furthermore, the logical units of the user interface do not have real-time capability and their latencies are decisively dependent on a system load, a state of the user interface and inputs by the user. In addition, many of the common user interfaces are based on a technology in which virtual machines cause additional unavoidable latencies during garbage collection operations, for example Java technology. Furthermore, buffered transitions to other contexts of the multimedia system may result in a delay or even interruption in the display, for example a command to display a navigation map or a very large number of successive user inputs. This may result in unpredictable fluctuations in the time between a request for an item of information and the display or even in an interruption in the active display. For example, a time difference may occur between engaging a reverse gear in a vehicle and the display of a reversing camera image. Reliable compliance with legally predefined times and legally relevant displays, which are relevant to approval under certain circumstances, therefore is possibly not guaranteed.

DE 10 2009 018 586 A1 discloses a computer system having at least one central vehicle computer which, for the purpose of displaying data, is connected to a plurality of operating units via a bus system and is connected to at least one display via a display data line. Furthermore, the computer system contains a camera system for acquiring image data and a plurality of camera image data lines for transmitting image data from the camera system to the display via an image data processing unit. The image data processing unit is a video control device which operates independently of the vehicle computer. The disadvantage of the known computer system is that an additional image data line and an additional image data processing unit have to be present in addition to the vehicle computer. An already existing vehicle computer which does not have real-time capability can be converted to form a faster vehicle computer, in particular a vehicle computer with real-time capability, only at high cost by installing additional hardware components.

DE 10 2013 000 273 A1 discloses an apparatus for displaying an item of information on a display of a driving-relevant processing unit in a vehicle, wherein the driving-relevant processing unit uses first image data and second image data to generate a superimposed image from contents of the two forms of image data and displays the image on a display.

DE 10 2017 110 896 A1 discloses a reversing video system for a vehicle, wherein a reversing camera generates a raw video signal. A video modification module receives the raw video signal and generates a modified video signal on the basis thereof. A video analysis module analyzes whether the modified video signal is valid or impermissible. A switch outputs the modified video signal to a display, if the vehicle is reversing and the modified video signal is valid, and outputs the raw video signal to the display, if the vehicle is reversing and the modified video signal is impermissible.

SUMMARY OF THE INVENTION

The method makes it possible to display sensor data as quickly as possible.

The method displays sensor data from a sensor on a display, wherein the sensor data are processed, before display, by a vehicle computer which has a predefined time requirement for processing the sensor data and has a first data path and a second data path. In other words, sensor data from a sensor are processed by a vehicle computer so that the data can be displayed on a display. The vehicle computer may have a predefined time requirement for processing the sensor data, wherein a predefined time requirement may be a maximum time which is intended to be required by the vehicle computer for processing the data. For example, there may be an undesirable delay in the display of the sensor data on the display if the predefined time requirement is exceeded. A sensor may be an optical, acoustic and/or electromagnetic sensor which can capture physical properties of its environment and converts them into an analog and/or digital signal in the form of sensor data. A display may be an optical display, for example a screen for displaying optical information, for example image representations and/or video representations. The first data path and the second data path in the vehicle computer can be programmed paths inside the vehicle computer on the software level which can transmit data to predefined programs and/or functions via one or more predefined hardware and/or software interfaces.

The method for displaying sensor data includes receiving a display query from a controller by the vehicle computer and evaluating the display query by the vehicle computer. Next, the sensor data are transmitted to display control in the vehicle computer via the first data path if the evaluation of the display query reveals that the sensor data are intended to be displayed, wherein the display control controls the management of a display on the display. Then, the sensor data are displayed on the display. The method also includes loading a graphical user interface from a graphics generator if the evaluation of the display query reveals that the sensor data are intended to be displayed and transmitting the graphical user interface to the display control via the second data path.

The graphical user interface is synchronized with the display of the sensor data and the synchronized graphical user interface is displayed together with the sensor data on the display.

In other words, the vehicle computer can receive, from a controller, a display query which can query whether sensor data are intended to be displayed on the display. The vehicle computer can evaluate this display query and, if it is determined that the sensor data are intended to be displayed, can transmit the sensor data to the display control in the vehicle computer via the first data path. The display control can be provided for the purpose of controlling the display and managing the display on the display. For example, the display control can receive sensor data and can format the latter for display on the display in such a manner that they are displayed in a predefined format. Furthermore, the display may include a plurality of screens and the display control can control the screen and/or screens on which the display is displayed. Furthermore, the display control can be provided for the purpose of managing further user inputs and data. The sensor data are displayed on the display at the end of the first data path. In parallel with or in addition to transmitting the sensor data to the display control, a graphical user interface is loaded from the graphics generator if the evaluation of the display query reveals that the sensor data are intended to be displayed. The graphics generator may be a memory in the vehicle computer which loads predefined graphical elements to generate the graphical user interface. However, the graphics generator may also be provided for the purpose of creating two-dimensional and/or three-dimensional graphics from raw data by image synthesis to load the graphical user interface. For this purpose, the graphics generator can resort to computing power of the vehicle computer. The graphical user interface may be an interface between a user and the vehicle computer. The graphical user interface may have operating elements, for example icons, which are activated via an input device which may be, for example, a computer mouse, a microphone for voice input, buttons and/or a pressure-sensitive sensor screen. Upon activation of an icon which can be used as a control element, the graphical user interface can start a function and/or a program which can be used to control components of a motor vehicle, for example. For example, the graphical user interface can be used to transmit a command to the display control, which command activates or deactivates the display. After the graphical user interface has been loaded, the graphical user interface can be transmitted to the display control via the second data path and can be synchronized with the display of the sensor data. The synchronized graphical user interface is then displayed, together with the display of the sensor data, on the display. The synchronization of the graphical user interface with the display of the sensor data may be such that the image data from both modalities are superimposed in such a manner that a merged image of both data records is displayed on the display. The graphical user interface may display relevant information relating to the sensor data in the display, for example. The sensor data may come from a reversing camera of a vehicle, for example, as a result of which an image from the reversing camera is displayed on the display. In addition to the image from the reversing camera, a graphical element which indicates a distance to an object behind the vehicle can be displayed in the synchronized graphical user interface.

The method results in the advantage that the display of the sensor data, which may contain time-critical information, can be quickly transmitted to the display by providing a first data path and a second data path, without infringing design specifications of the graphical user interface. The first data path makes it possible to securely and quickly transmit the necessary sensor data and the second data path contains information which ensures that the design specifications of the respective graphical user interface are complied with. Furthermore, it is possible to prevent interruptions in the display as a result of an abnormal behavior of any applications or of the graphical user interface. It is therefore possible to comply with legal requirements for a maximum delay of the display and for the field of view, for example. This method can be implemented in vehicle computers without real-time capability, as are commercially available, without orienting their entire architecture and development to real-time capability, wherein the real-time capability here may be the compliance with the predefined time requirement for the vehicle computer. The method makes it possible to minimize development costs and expenses while simultaneously complying with legal specifications.

One embodiment provides for the evaluation of the received display query to be carried out by a predefined protocol. The predefined protocol may be a simple program which evaluates basic queries which are directed to the vehicle computer. The predefined protocol may evaluate a display query with a minimum amount of time and a minimum computing capacity of the vehicle computer. For example, the predefined protocols may be based on a C code and/or a C++ code. This embodiment results in the advantage that a display query to the vehicle computer can be quickly processed and a delay in the display of sensor data on the display can be minimized.

Another embodiment provides for the method to also include, between displaying the sensor data and loading a graphical user interface, suppressing a control command from the vehicle computer to the display control until the graphical user interface is displayed together with the sensor data. In other words, commands from the vehicle computer to the display control are suppressed or blocked until the graphical user interface is displayed, together with the sensor data, on the display. For example, user inputs for the display of further data which are intended to be displayed on the display can be stored in a buffer of the vehicle computer. Suppressing the control command to the display control makes it possible to prevent the display of the sensor data from being delayed and/or interrupted.

Another embodiment provides for the display query to be transmitted by the controller by a user query and/or in an automated manner. In other words, a user can manually trigger the display query by actuating a switch, for example, with the result that the sensor can assist the user. Alternatively or additionally, the display query can be transmitted in an automated manner. For example, a user in a vehicle can engage a reverse gear, as a result of which a display query is automatically transmitted to the vehicle computer by the controller. Provision may also be made for a predetermined condition to occur, which condition triggers the display query. The predetermined condition may be, for example, restricted visibility on account of darkness or fog, for example, as a result of which a sensor is intended to be switched on for assistance. The advantage of this embodiment is that the display of the sensor data can be reliably made available to a user.

One embodiment provides for the display control to be controlled by the graphical user interface. In other words, commands which are input by the graphical user interface can control the display control. For example, a user can use the graphical user interface, which may be the interface between the user and the vehicle computer, to cause a display change from one screen of the display to another screen of the display and/or to request the removal of, that is to say switch off, the display on the display. This has the advantage that a user has control of the display of the display via the graphical user interface.

Another embodiment provides for the sensor data to be processed in real time. Processing in real time means that the processing of the sensor data takes place with a minimum delay and corresponds to international standards for processing data. In particular, a delay when processing the sensor data may be less than 1000 ms. This results in the advantage that legal requirements imposed on the display of the sensor data can be complied with.

Also described is a display system of a vehicle, having a vehicle computer with a display control and a graphics generator, having a sensor which is designed to acquire sensor data, having a display which is designed to display the sensor data, and having a controller which is designed to transmit a display query for displaying the sensor data to the vehicle computer. The vehicle computer also has a first data path and a second data path and is designed to receive and evaluate the display query from the controller, to transmit the sensor data to the display control via the first data path if the evaluation of the display query reveals that the sensor data are intended to be displayed, to control the display to display the sensor data, to load a graphical user interface from a graphics generator if the evaluation of the display query reveals that the sensor data are intended to be displayed, to transmit the graphical user interface to the display control via the second data path, to synchronize the graphical user interface with the display of the sensor data, and to control the display to display the synchronized graphical user interface together with the display of the sensor data. The same advantages and variation possibilities as in the method arise here.

One embodiment provides for the sensor to be a sensor of a driver assistance system. This results in the advantage that important sensor data from the sensor of the driver assistance system can be displayed with a minimum time delay and legally predefined times are therefore complied with.

Another embodiment provides for the sensor to be a camera. The camera may be a video camera which can continuously record image sequences of the environment in order to therefore be able to display regions which are poorly visible and/or not visible to a user. This results in the advantage that the sensor can provide optical information relating to the environment.

Another aspect relates to a motor vehicle having the display system. A motor vehicle may be an automobile, a truck or a bus.

There are developments of the display system which have features already described in connection with the developments of the method. In addition, there are developments of the method which have features described in connection with the display system. For this reason, the corresponding developments of the method are not described again here.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENTS

In the exemplary embodiments explained below, the described components of the embodiments each represent individual features which can be considered independently of one another and also each develop the invention independently of one another. Therefore, the invention encompasses combinations other than the described combinations of the features of the embodiments. Furthermore, the described embodiments can also be supplemented with further features of the features which have already been described.

In the figures, identical reference signs each denote functionally identical elements.

Figure 1:
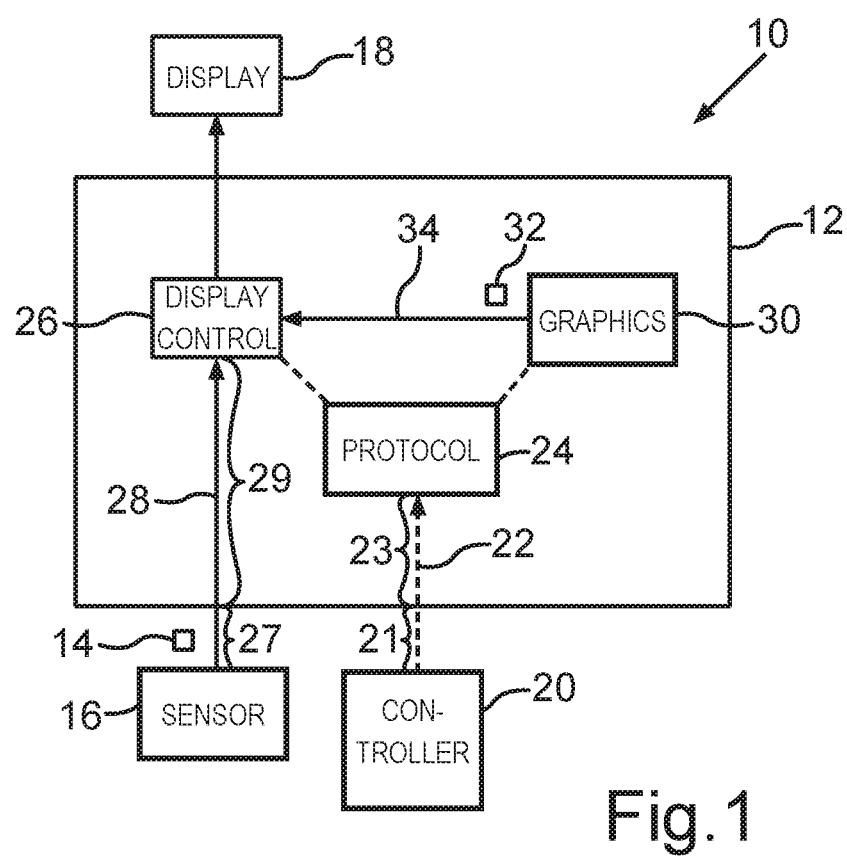
FIG. 1 is a schematic block diagram of one embodiment of a display system for displaying sensor data.

FIG. 1 shows a display system 10 having a vehicle computer 12 for displaying sensor data 14 from a sensor 16 on a display 18. The display system 10 may be arranged in a motor vehicle, in particular in an automobile. The vehicle computer 12 may be an on-board computer of the motor vehicle or the computer of a multimedia system. The multimedia system and/or the vehicle computer 12 may be designed to provide a driver of the motor vehicle with information. The information may be, in particular, traffic information, vehicle information, entertainment information and/or information relevant to driving safety. Information relevant to driving safety may be, in particular, sensor data 14 from the sensor 16.

The sensor 16 may belong to a driver assistance system which assists the driver during the journey. For example, the sensor 16 may be a camera, wherein the camera may be a video camera which can electronically capture image sequences and can forward these image data as sensor data 14. In particular, the sensor 16 may be a reversing camera of the motor vehicle, for example for assisting with a parking operation.

The exemplary embodiment shown in FIG. 1 is based on the following situation, by way of example. The driver of the motor vehicle can engage the reverse gear of the motor vehicle for a parking operation. A controller 20 can then transmit a display query 22 to the vehicle computer 12. In this case, the communication with the vehicle computer 12 and the controller 20 can take place via a signal path 21 which is outside the computer and can include one or more data buses, for example a "Controller Area Network" (CAN). The signal path 21 outside the computer may be in the form of Ethernet. In the vehicle computer 12, a predefined protocol 24 can evaluate the received display query 22. The signal path from the controller 20 to the predefined protocol 24 inside the vehicle computer 12 may be a signal path 23 which is inside the computer and may be a data bus, for example an "Inter-Integrated Circuit" (I-2-C).

A predefined protocol may be, for example, a simple function which requires few computing resources and makes a quick selection regarding whether or not sensor data 14 from the sensor 16 are intended to be displayed.

If the evaluation of the display query 22 by the predefined protocol 24 in the vehicle computer 12 reveals that the sensor data 14 are intended to be displayed, the sensor data 14 can be transmitted from the sensor 16 to a display control 26 via a first data path 28. The decision by the predefined protocol 24 in the vehicle computer 12 with regard to the fact that the sensor data 14 are intended to be displayed can be transmitted to the display control 26, for example by a signal, which is indicated as a dashed line between the predefined protocol 24 and the display control 26 in FIG. 1. However, a signal can also be additionally or alternatively transmitted to the controller 20 which can then control the sensor 16 to transmit sensor data 14 via the first data path 28.

The first data path 28 can be divided into a data path 27 outside the computer and a data path 29 inside the computer and can include a hardware connection and/or a software connection. The first data path 28 may have a data bus system to the vehicle computer 12. In the vehicle computer 12, the first data path 28 can be continued as a software path to the display control 26 via a data path 29 which is inside the computer and may be an internal interface, for example a program in the vehicle computer. The data path 27 outside the computer may use one or more data buses, in particular Ethernet, and may be provided for "Low Voltage Differential Signaling" (LVDS) and/or a composite video signal (LVDS). The data path 29 inside the computer may be in the form of a "Camera Serial Interface" (CSI) and/or in the form of a "Serial Peripheral Interface" (SPI).

Provision may also be made for the data path 27 outside the computer and the signal path 21 outside the computer to transmit data via the same data bus. For example, the data path 27 outside the computer and the signal path 21 outside the computer can both transmit data or signals via an Ethernet connection.

The display control 26 may be provided for the purpose of managing a display on the display 18. The display 18 may be, for example, a head-up display and/or a screen, for example the screen of a multimedia system. Furthermore, the display control 26 can process the sensor data 14 in such a manner that they can be displayed on the display 18. For example, provision may be made of a codec which converts the sensor data 14 from one video format to another. In the case of the reversing camera, the display control 26 can select the container format used and the video compression, for example, in such a manner that the sensor data 14 can be displayed on the display 18.

In addition to transmitting the sensor data 14, a graphics generator 30 can load a graphical user interface 32, after the display query 22 has been received by the predefined protocol 24, if the evaluation of the display query 22 reveals that the sensor data 14 are intended to be displayed (indicated as a dashed line between the predefined protocol 24 and the graphics generator 30 in FIG. 1).

The graphics generator 30 may include a database on a storage medium, from which the graphical user interface 32 can be loaded. The loaded graphical user interface 32 may have symbols, control elements and 3-D graphics, by which data can be prepared for a user and with which control commands can be activated.

After being loaded by the graphics generator 30, the graphical user interface 32 can be transmitted to the display control 26 via a second data path 34, which may be inside the vehicle computer 12, and can be synchronized with the display of the sensor data 14. During synchronization, the display of the sensor data 14 and the graphical user interface 32 may be superimposed in such a manner that a homogeneous superimposed image of the two modalities is produced. The synchronized graphical user interface 32 can then be displayed, together with the display of the sensor data 14, on a screen of the display 18. The method shown in this exemplary embodiment makes it possible to ensure that a predefined time requirement imposed on the vehicle computer 12 can be complied with. For example, the predefined time requirement imposed on the vehicle computer 12 may be the fact that the sensor data 14 are processed by the vehicle computer 12 in real time in accordance with international standards. For example, the predefined time requirement may be the fact that the data are processed in less than 1000 ms or in less than 2000 ms. This can be achieved by directly displaying the sensor data 14 important for the display on the display 18 via the first data path 28 without having to wait for the loading of the graphical user interface 32, which can be completed only with a time delay.

Figure 2:
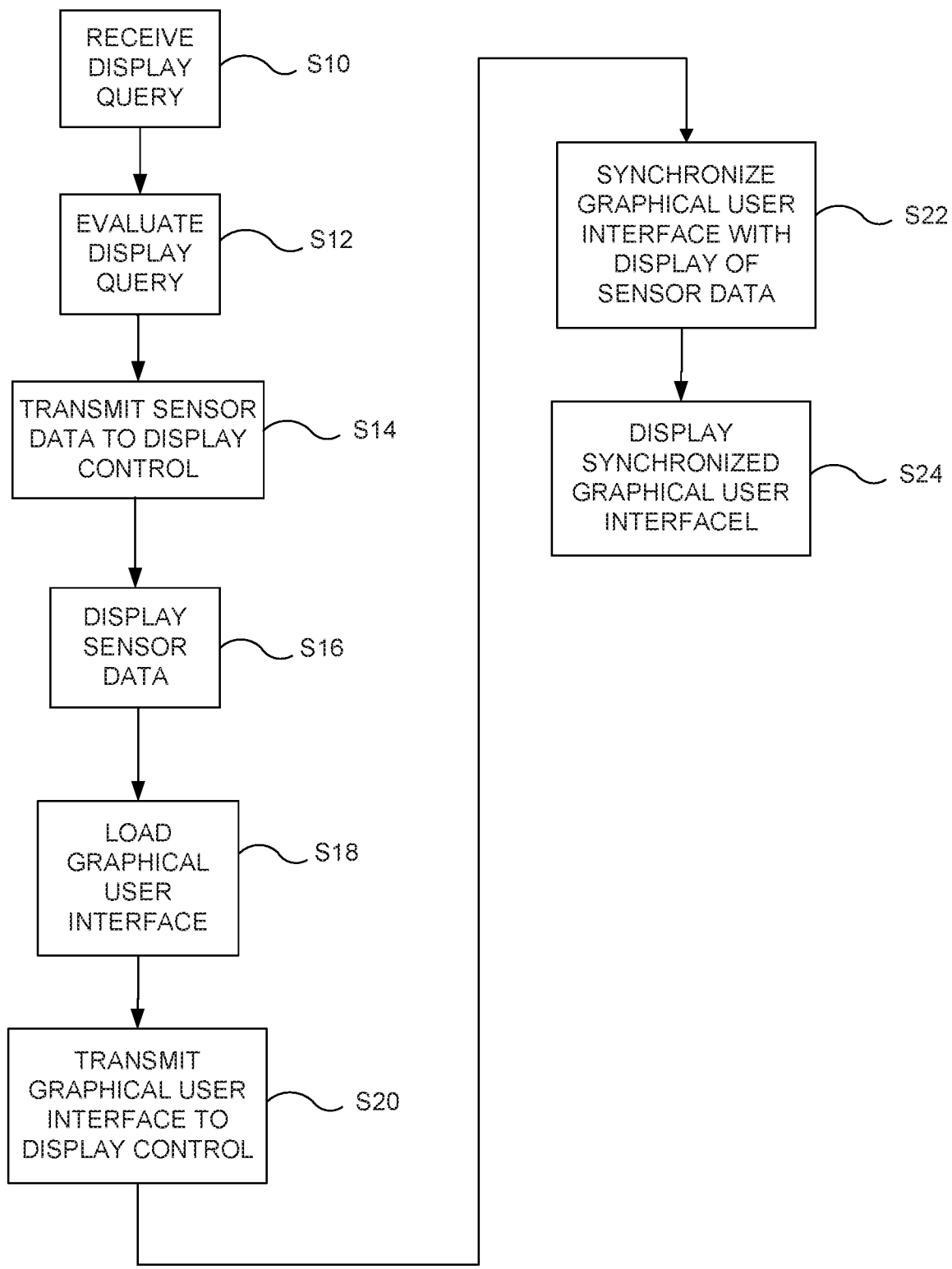
FIG. 2 is a flowchart of one embodiment of the method.

FIG. 2 illustrates a schematic method diagram of one embodiment. In S10, a display query 22 from a controller is received by the vehicle computer 12. In S12, the display query 22 is evaluated by the vehicle computer 12. In S14, the sensor data 14 are transmitted to a display control 26 if the evaluation of the display query 22 reveals that the sensor data 14 are intended to be displayed. In S16, the sensor data 14 are displayed on the display 18. In S18, a graphical user interface 32 is loaded from a graphics generator 30 if the evaluation of the display query 22 reveals that the sensor data 14 are intended to be displayed. In S20, the graphical user interface 32 is transmitted to the display control 26 via a second data path 34. In S22, the graphical user interface 32 is synchronized with the display of the sensor data 14. Finally, in S24, the synchronized graphical user interface 32 is displayed, together with the display of the sensor data 14, on the display 18.

In another exemplary embodiment, one aspect involves pursuing a two-stage approach with a first data path 28 and a second data path 34. In a first stage, basic low-level system components, which are based on a C code (predefined protocol 24) for example, evaluate a display query 22 from a function control device (controller 20) and respond according to the predefined protocols 24. This communication is carried out via a direct interface between the components inside the multimedia system, that is to say via the first data path 28. If the communication between the vehicle computer 12 and the function control device (controller 20) results in application of the contents, for example from a reversing camera image, these sensor data 14 are directly displayed on the display 18 via a direct path (first data path 28) irrespective of a state of a user interface (graphical user interface 32) or any transitions.

In a second stage, the information relevant to the user interface (graphical user interface 32) is interchanged between the multimedia system (vehicle computer 12) and the function control device (controller 20) on a further path which may include a signal path 21, which is outside the computer and can be a data bus, and a signal path 23 inside the computer, and may be formed as part of a second data path.

Decoupling the display of the optical information in the sensor data 14 via the first data path 28 from the contents and the control via the graphical user interface 32, which is effected via the second data path 34, means that the time-critical information in the sensor data 14 is displayed quickly. Additional details can be interchanged via the second data path 34 and can be displayed in addition to the time-critical information in the sensor data 14 as soon as the graphical user interface 32 has completed its processing, for example the interchange of information, loading of 3-D resources, rendering of contents. The components involved in the fast display via the first data path 28, for example the display control 26, additionally suppress any interruption in the display as long as the display query 22 is valid and the graphical user interface 32 is not yet able to process the display. A valid request to remove the display on the display 18 can then be effected according to defined design rules of the graphical user interface 32.

The concept described here is based on an architecture in which central system components, for example the display control 26, control the management of the display on different screens of the display 18. The display control 26 can additionally include a component, for example a video codec, in order to receive video signals from different sensors 16 and to display them on the display 18. In order to keep latencies low, the display control 26 may be able to control displays independently of the graphical user interface 32.

Signaling via the first data path 28 is always required. This avoids all delays in the processing of the sensor data 14 by the graphical user interface 32. It is therefore possible to comply with predefined time requirements for the signal propagation times of the sensor data 14 which increase only slightly even in the case of a high system load which may be caused, for example, by multimedia contents or user interactions.

After application has been effected by the first data path 28, the respective content of the sensor data 14 is presented on any desired display of the display 18, for example a video stream from a reversing camera on a screen in the driver's compartment.

This can take place irrespective of the state of the processing of the respectively relevant graphical user interface 32 or the user interactions effected until then. In parallel with the display of the sensor data 14, any communications and actions which result in complete display of the desired multimedia context by the graphical user interface 32 are carried out via the second data path 34. These include all elements needed to comply with the design specifications.

As soon as the graphical user interface 32 has been loaded and processed by the graphics generator 30, display synchronization with the display control 26 is carried out. The graphical contents of the graphical user interface 32 are therefore processed and presented, together with the video stream of the sensor data 14, in a unified display of the display 18.

For this purpose, the video data streams (sensor data 14) are combined with all relevant elements of the graphical user interface 32 in the multimedia system, that is to say the vehicle computer 12, to form one or more image streams which can then be presented on any desired number of screens of the display 18.

After this synchronization, a request to remove the display can be carried out according to logic of the graphical user interface 32, that is to say the request to remove the display can be controlled via the graphical user interface 32. This can be carried out by user interaction on the multimedia system or by a removal request via the respective function control devices (controller 20).

If a request to remove the display is effected before the graphical user interface 32 is able to process the removal request, the display control 26 can independently request the removal of the display. Only after successful display synchronization between the graphical user interface 32 and the display control 26 can the logical units of the graphical user interface 32 assume control of the displayed contents again, that is to say the graphical user interface 32 can assume control of the display control 26 when the display synchronization has been successfully concluded.

Overall, the examples show how a method for reliably displaying time-critical optical information in infotainment systems without real-time capability can be provided.

The many features and advantages of the embodiments are apparent from the detailed specification and, thus, it is intended by the appended claims to cover all such features and advantages of the embodiments that fall within the true spirit and scope thereof. The claims may include the phrase "at least one of A, B and C" as an alternative expression that means one or more of A, B and C may be used, contrary to the holding in Superguide v. DIRECTV, 358 F3d 870, 69 USPQ2d 1865. Further, since numerous modifications and changes will readily occur to those skilled in the art, it is not desired to limit the embodiments to the exact construction and operation illustrated and described, and accordingly all suitable modifications and equivalents may be resorted to, falling within the scope thereof.

What is claimed is:

1. A method for displaying sensor data from a sensor on a display, the method comprising:
   receiving, by a vehicle computer, a display query sent from a controller via a signal path outside the vehicle computer, having a predefined time requirement for processing the sensor data, the vehicle computer having multi-layered communication with multimedia systems, function control devices and the controller, including via a first data path and a second data path;
   evaluating the display query by the vehicle computer;
   transmitting the sensor data to a display control in the vehicle computer via the first data path when said evaluating of the display query reveals that the sensor data are intended to be displayed, the display control controlling the management of the display;
   displaying the sensor data on the display;
   loading a graphical user interface from a graphics generator, when the evaluation of the display query reveals that the sensor data are intended to be displayed;
   transmitting the graphical user interface to the display control in the vehicle computer via the second data path;
   synchronizing the graphical user interface with the displaying of the sensor data; and
   displaying the graphical user interface synchronized with the sensor data on the display.

2. The method according to claim 1, wherein said evaluating of the display query is carried out by a predefined protocol.

3. The method according to claim 2, further comprising, between said displaying and said loading, suppressing a control command within the vehicle computer to the display control until the graphical user interface is displayed together with the sensor data.

4. The method according to claim 3, wherein the display query is transmitted by the controller at least one of by a user query and in an automated manner.

5. The method according to claim 4, wherein the display control is controlled by the graphical user interface.

6. The method according to claim 5, wherein the sensor data are processed in real time.

7. The method according to claim 1, further comprising, between said displaying and said loading, suppressing a control command within the vehicle computer to the display control until the graphical user interface is displayed together with the sensor data.

8. The method according to claim 1, wherein the display query is transmitted by the controller at least one of by a user query and in an automated manner.

9. The method according to claim 1, wherein the display control is controlled by the graphical user interface.

10. The method according to claim 1, wherein the sensor data are processed in real time.

11. A display system of a vehicle having a sensor device configured to acquire sensor data, comprising:

a display device configured to display the sensor data;
a controller configured to transmit a display query requesting display of the sensor data; and
a vehicle computer having multi-layered communication with multimedia systems, function control devices and the controller, including via a first data path and a second data path and configured to
provide display control and graphics generation,
receive and evaluate the display query from the controller,
supply the sensor data for the display control via the first data path when evaluation of the display query reveals that the sensor data are intended to be displayed,
control the display device to display the sensor data,
load a graphical user interface obtained by the graphics generation when the evaluation of the display query reveals that the sensor data are intended to be displayed,
provide the graphical user interface for the display control via the second data path,
synchronize the graphical user interface with the display of the sensor data, and
control the display device to display the graphical user interface synchronized with the sensor data.

12. The display system according to claim 11, wherein the sensor device is a sensor of a driver assistance system.

13. The display system according to claim 11, wherein the sensor device is a camera.

14. The display system according to claim 11, wherein between the display of the sensor data and loading of the graphical user interface, a control command within the vehicle computer to the display control is suppressed until the graphical user interface is displayed synchronized with the sensor data.

15. A motor vehicle, comprising:
a sensor device configured to acquire sensor data;
a display system having a display device configured to display the sensor data and a controller configured to transmit a display query requesting display of the sensor data; and
a vehicle computer having multi-layered communication with multimedia systems, function control devices and the controller, including via a first data path and a second data path and configured to
provide display control and graphics generation,
receive and evaluate the display query from the controller,
supply the sensor data for the display control via the first data path when evaluation of the display query reveals that the sensor data are intended to be displayed,
control the display device to display the sensor data,
load a graphical user interface obtained by the graphics generation when the evaluation of the display query reveals that the sensor data are intended to be displayed,
provide the graphical user interface for the display control via the second data path,
synchronize the graphical user interface with the display of the sensor data, and
control the display device to display the graphical user interface synchronized with the sensor data.

16. The motor vehicle according to claim 15, wherein the sensor is a sensor of a driver assistance system.

17. The motor vehicle according to claim 15, wherein the sensor is a camera.

18. The motor vehicle according to claim 15, wherein between the display of the sensor data and loading of the graphical user interface, a control command within the vehicle computer to the display control is suppressed until the graphical user interface is displayed synchronized with the sensor data.

19. The motor vehicle according to claim 15,
further comprising:
a bus system, and
a plurality of components connected to the vehicle computer via the bus system, and
wherein the vehicle computer is further configured to output commands, via the bus system, controlling the components of the motor vehicle.

* * * * *